M. A. THIEL.
MIXING VALVE FOR GAS ENGINES.
APPLICATION FILED FEB. 7, 1917.
1,317,948.
Patented Oct. 7, 1919.
2 SHEETS—SHEET 1.
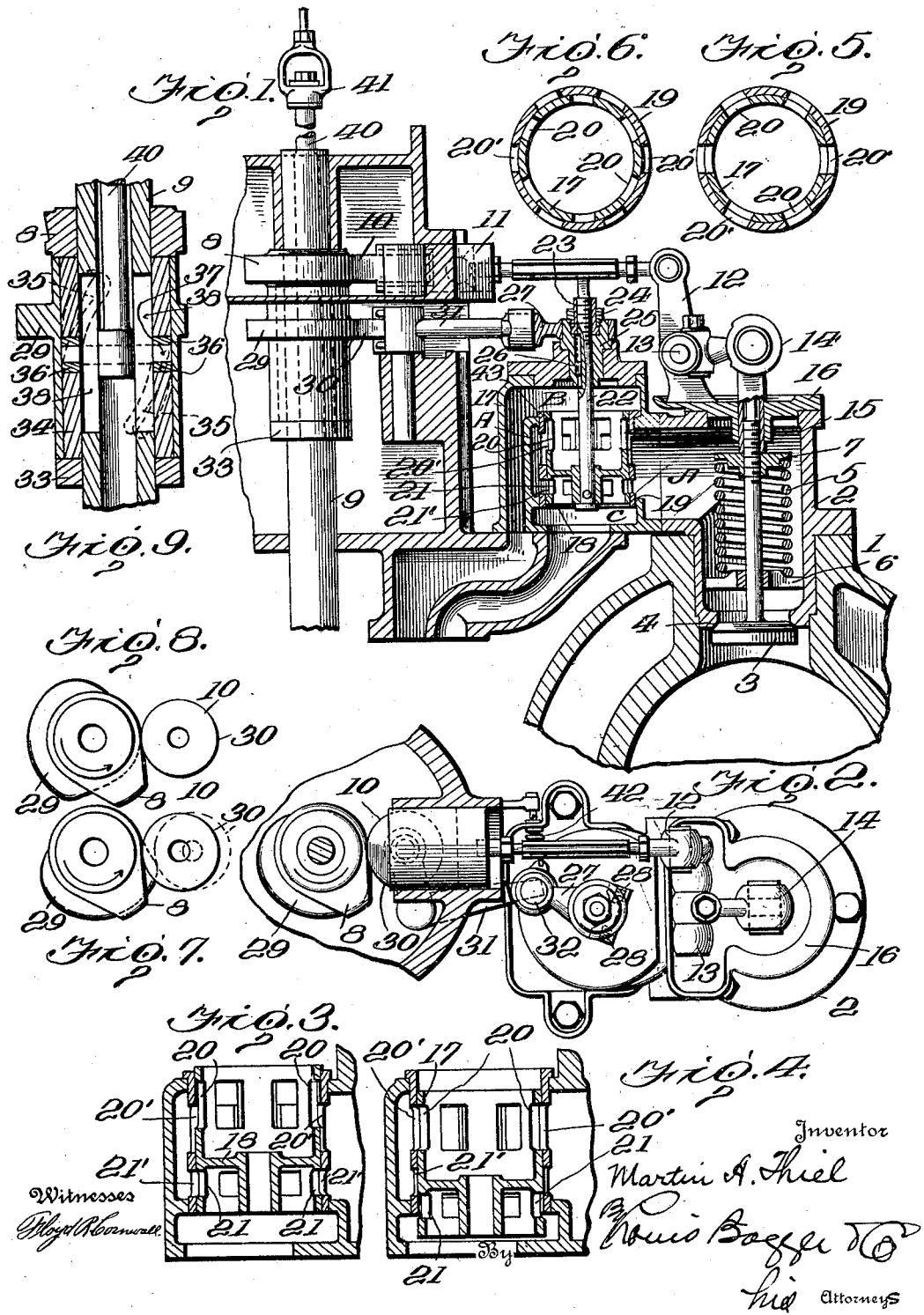

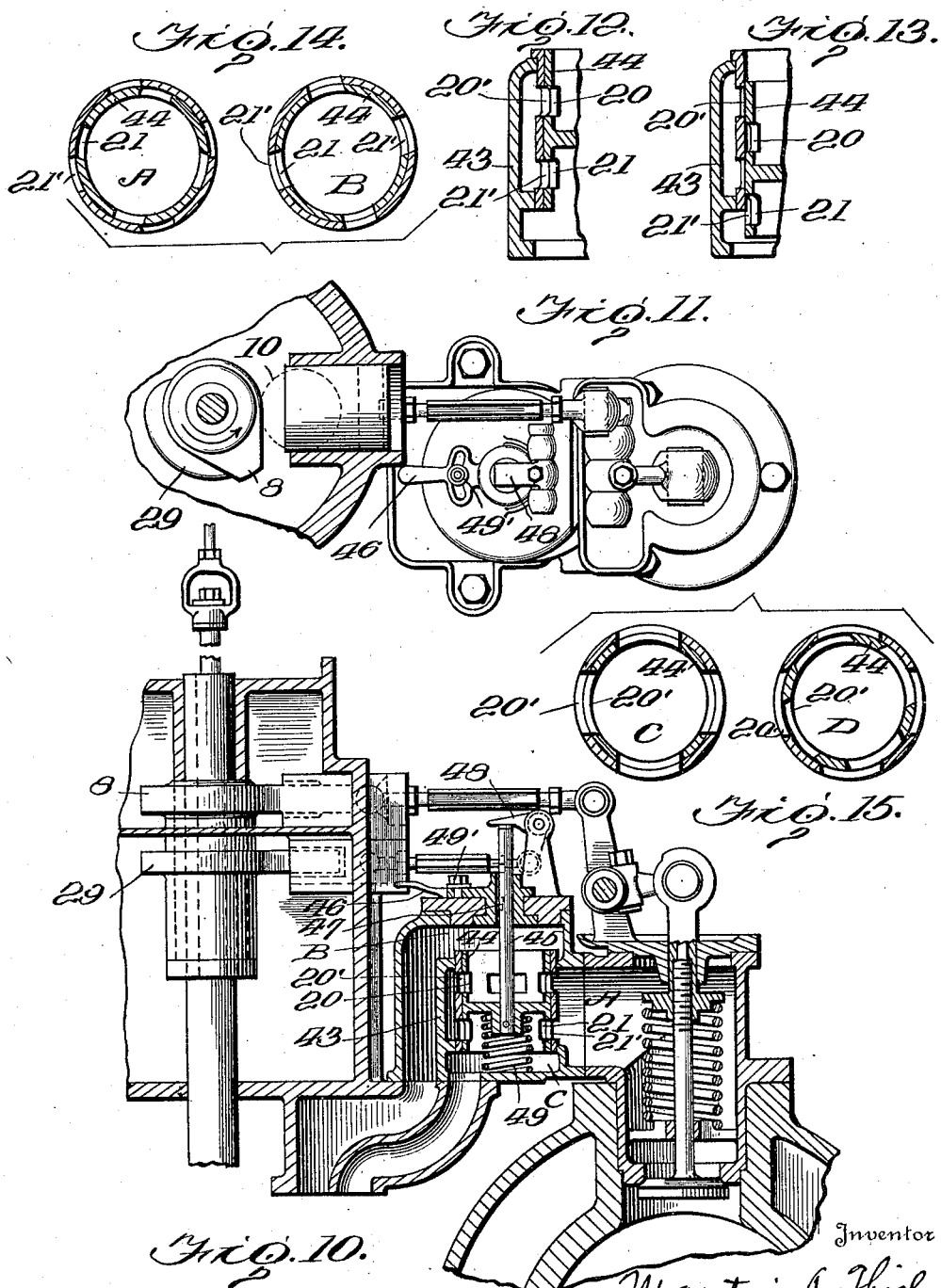

UNITED STATES PATENT OFFICE.

MARTIN A. THIEL, OF MOUNT VERNON, OHIO.

MIXING-VALVE FOR GAS-ENGINES.

1,317,948.   Specification of Letters Patent.   Patented Oct. 7, 1919.

Application filed February 7, 1917. Serial No. 147,251.

*To all whom it may concern:*

Be it known that I, MARTIN A. THIEL, a citizen of the United States, residing at Mount Vernon, in the county of Knox and State of Ohio, have invented certain new and useful Improvements in Mixing-Valves for Gas-Engines, of which the following is a specification.

My invention relates to an improvement in mixing valves for gas engines, by which I purpose to provide mechanism in which the mixture of gas and air can be proportioned in a manner that will produce the most economical combustion of the charge supplied to the engine cylinder regardless of the heat value in the gas used. Also that by the quick closing of both air and gas ports ahead of the usual inlet valve during every cycle, a reduction of the negative work necessary to induce the new mixture into the cylinder can be brought about. My combination allows closer governing of the engine's speed during varying loads and introduces other new features of construction all as hereinafter set forth.

Reference is to be had to the accompanying drawing forming part of the specification, in which similar letters of reference indicate corresponding parts in all figures.

Figure 1 shows a section on the line A—B in Fig. 2.

Fig. 2 shows a plan view of the operating mechanism.

Fig. 3 shows the mixing valve set for a low heat value gas.

Fig. 4 shows the same valve set for a high heat value gas.

Fig. 5 shows the position of valve when cams are in the position in Fig. 7.

Fig. 6 shows the position of valve when cams are in the position shown in Fig. 8.

Figs. 7 and 8 show two positions of the controlling cams.

Fig. 9 shows section through cut off cam, 29, lay shaft 9, and governor connection.

Fig. 10 is a cross sectional view of a modified form of my invention.

Fig. 11 shows a top plan view of the same.

Fig. 12 shows a sectional detail of the ported valve in my modification.

Fig. 13 shows a detail sectional view of the same with valve closed.

Fig. 14 shows a sectional plan view of the gas ports of my modified ported valve.

Fig. 15 shows a sectional plan view of the air ports of my modified ported valve.

In the construction shown in Fig. 1, numeral 1 denotes part of a gas engine cylinder to which the inlet valve cage 2, is fastened. The inlet valve 3, rests against a seat 4, part of cage 2, and held in place by a compression spring 5, mounted on spider 6, and resisted by plate nut 7, forcing the inlet valve against its seat. Cam 8, is fixed to lay shaft 9 which when rotated engages roller 10, part of cross head 11, and through bell crank 12, made to swing on fulcrum 13, opens inlet valve 3 through shackle 14, screwed to valve stem 15, and fitted slidingly through valve cap, 16, which is bolted to valve cage 2.

It is plain that this arrangement will open and close the inlet valve 3, which is so timed as to allow a mixture of air and gas to enter the cylinder at the proper moment when the piston begins its suction stroke. As the ported regulating valve 17, with its plate 18, fitted into the ported cage 19, is introduced into the inlet pipe for the control of the volume admitted, it must follow that the relative size of the air ports 20 and 20′ to the gas ports 21 and 21′, (see Figs. 3, 4, 5 and 6) can be so chosen to produce a mixture containing correct proportions of gas and air regardless of the heating value of the gas used as engine fuel, because of the possibility of the vertical adjustment of regulating valve 17, through pinned stem 22, by turning nut 23, and again locking it by cap nut 24.

For example, should the regulating valve 17, Fig. 4, be shifted upward, the port opening indicated by the arrow on the bottom or gas side of this valve will increase in area because of the position ports 21 and 21′ will have taken relative to each other and a greater volume of gas is admitted to mixing chamber A. After this upward movement the upper or air side will have diminished its port area through openings 20 and 20′ as shown by second arrow thus reducing the volume of air admitted in the same proportion as that of the gas port has been increased until the maximum variation has been reached as shown in Fig. 3.

It is a well known fact that gas engine fuel economy depends upon the complete burning out of the combustible contained in the mixture that constitutes the charge which through its expansion by heat forms the power stroke of the cycle used. Therefore, it follows that a different port area must be chosen for each kind of gas used for an engine's fuel when greatest thermal efficiency is desired. After having taken care of the mixture proportions it is necessary to measure its volume to suit the load on the engine; which in most instances is of a varying nature. Most regulating systems accomplish this by throttling the volume which by "wire drawing" the charge through choked openings will cause the suction pressure in the engine's cylinder to drop far below atmospheric pressure resulting in an appreciable power loss. In order to minimize this defect I have provided a quick closing arrangement to valve 17, Fig. 1. It is accomplished by cam 29, which is made to rotate in the same direction as cam 8, by cam shaft 9, but is so fixed that its motion can be advanced or retarded by the governor in a manner explained later.

The inlet valve 17, is quickly closed early in the cycle for light loads but later in the cycle as the load increases. Cam 29 for handling valve 17 is so shaped that it will always open ahead of valve 3, (see Figs. 5 and 7). All ports in regulating valve 17 are wide open when inlet valve 3 opens to supply the cylinder with its mixture at atmospheric pressure on the piston's suction stroke and remain open until cam 29 will quickly close said valve 17 at a point predetermined by the governor.

There is a partial vacuum created in the cylinder by the piston going to the end of cylinder by its suction stroke, when valve 17 has been closed early, and the rarefied gases will largely be re-compressed when piston returns on its compression stroke causing practically no loss of power from negative work. The mechanism by which this result is accomplished is described as follows:

The regulating valve cage 19, is fixed into regulating valve housing 43 which contains air passage B, gas passage C and mixture passage A.

The regulating valve in addition to its longitudinal adjustment previously described has an oscillating motion imparted to it through stem 22 to which it is fastened. Stem 22 is locked rotatively to bearing collar 25 by means of a feather key 26. Bearing collar 25 is locked to regulating valve arm 27 by means of set screws 28 which rest against flat seats milled into bearing collar 25. By loosening one set screw and tightening the other a rotative adjustment of regulating valve 17 is obtained independent of its oscillating motion. The regulating valve 17, Fig. 1 is given its oscillating movement in one direction from regulating cam 29 through roller 30, bell crank 31, pin 32, and arm 27 (Fig. 2) and is returned in the opposite direction by means of spring 42.

The regulating cam 29 (Fig. 9) is held longitudinally between cam 8 and collar 33 around lay shaft 9, and is fastened to regulating sleeve 34 which contains helical slots 35. Fitted into these slots are guide blocks 36 pivoted on ends of pin 37 which passes through longitudinal slots 38 in lay shaft 9 and is fastened into governor rod 40 which in turn is connected to any suitable form of governor through swivel 41, Fig. 1. The purpose of this slot mechanism is to advance or retard the rotative position of cam 29 in reference to lay shaft and inlet cam 8 dependent upon the longitudinal position of the governor rod 40. Thus, when governor rod 40 is pulled up the pin 37 guided in longitudinal slots 38 follows helical slots 35 causing the cam 29 to rotate in the direction of the arrow in Figs. 7 and 8. When the rod is pushed down the cam 29 rotates in a direction opposite to the arrows. For any fixed position of the governor rod the cam 29 rotates in unison with lay shaft 9 and cam 8.

Fig. 7 shows the relative positions of cams 8 and 29 when governor rod 40 is in its extreme upper position, viz: the cam 29 advanced so that it will cause the regulating valve 17 to close just as cam 8 causes inlet valve 3 to open and while in this position allows no mixture to enter the cylinder.

Fig. 8 shows the relative position of the cams 8 and 29 when governor rod is in its extreme lower position, viz; the cam 29 retarded so that it will not cause regulating valve 17 to close until cam 8 has opened and closed inlet valve 3 allowing the maximum volume of mixture to enter into cylinder bringing about a condition known as maximum load position.

In my modification the piston valve 44 of Fig. 10 is closed by a downward movement through the same cam movement as explained above, through bell crank 48, and stem 45, against the action of the spring 49, by which it is returned to its normal position. Valve 44 is held in position by a feather key 47, and arm 46 which is keyed on stem 45 and turns upon it as a center.

A bolt 49' is provided to hold the arm 46 in a rigid position, yet permitting rotative adjustment of gas and air ports to receive the proportional area required for the proper mixture of gas and air suitable to the B. T. U. value contained in the gas used. In Figs. 12 and 13 is shown the operation of the valve 44. In Fig. 14 is shown the adjustment of the gas ports as registered for the different valued gases. A, being adjusted for high value gases and B for low value gases. The adjustment of the air ports as shown in Fig. 15 is practically the same.

It will be seen that both methods bring about identical results as far as correct proportioning of gas and air mixtures are concerned without changing the velocity of the ingoing mixtures through the ports, no matter what adjustment or setting of the valve may have been selected.

I claim:

1. In a gas engine mixing valve, a cylinder, an inlet valve therefor, air and gas passages, a ported valve controlling said passages, rotary devices, means actuated thereby for the control of said valves, automatic means for the axial adjustment of one of said rotary devices with respect to each other, and said ported valve being both opened and closed by its rotary device when the adjustable cam is in a certain position in advance of the opening of the inlet valve.

2. In a gas engine mixing valve, a cylinder, an inlet valve therefor, air and gas passages, a ported valve controlling said passages, rotary devices, one constant and the other automatically axially controlled by a governor and means actuated by said rotary devices extending to the said valves, one of said means being actuated to open and close its valve in advance of the other, when it is in a certain position.

3. In a gas-engine mixing-valve, a cylinder, a mixing-chamber, air and gas inlets thereto, a valve for controlling the passage of the mixture into the cylinder, a ported valve for controlling the passage of both air and gas into the mixing-chamber, means for manually regulating the size of the ports in said valves, means for oscillating the valve, and automatic means for advancing or retarding the oscillation of the valve.

4. In a gas-engine mixing-valve, a cylinder, a mixing-chamber, air and gas inlets thereto, a valve for controlling the passage of the mixture into the cylinder, a double-ported valve, one set of ports for regulating the amount of air and the other the amount of gas to the mixing-chamber, means for manually regulating the size of the ports in said valves, means for oscillating the valve, and automatic means for advancing or retarding the oscillation of the valve.

In testimony whereof I affix my signature, in the presence of two witnesses.

MARTIN A. THIEL.

Witnesses:
WM. L. ROBINSON,
E. V. JAMISON.